US012731081B2

(12) United States Patent
Pan et al.

(10) Patent No.: US 12,731,081 B2
(45) Date of Patent: Sep. 8, 2026

(54) VISION-LANGUAGE-PLANNING (VLP) MODELS WITH AGENT-WISE LEARNING FOR AUTONOMOUS DRIVING

(71) Applicant: Robert Bosch GmbH, Stuttgart (DE)

(72) Inventors: Chenbin Pan, Syracuse, NY (US); Burhaneddin Yaman, San Jose, CA (US); Tommaso Nesti, Mountain View, CA (US); Abhirup Mallik, Santa Clara, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 486 days.

(21) Appl. No.: 18/388,601

(22) Filed: Nov. 10, 2023

(65) Prior Publication Data

US 2025/0156745 A1 May 15, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
USPC ........................................................... 706/12
See application file for complete search history.

(56) References Cited

U.S. PATENT DOCUMENTS

| | | | | |
|---|---|---|---|---|
| 12,158,762 | B1 | 12/2024 | O'Hara et al. | |
| 2022/0230016 | A1 | 7/2022 | Ahamed et al. | |
| 2022/0269279 | A1* | 8/2022 | Redford | G05D 1/0221 |
| 2022/0332317 | A1 | 10/2022 | Lewandowski et al. | |
| 2023/0252795 | A1 | 8/2023 | Tong et al. | |
| 2023/0278587 | A1 | 9/2023 | Wu | |

(Continued)

FOREIGN PATENT DOCUMENTS

| | | | |
|---|---|---|---|
| CN | 111002980 | A | 4/2020 |
| CN | 114071013 | B | 6/2023 |
| DE | 102020202476 | A1 | 8/2021 |

OTHER PUBLICATIONS

Wayve, LINGO-1: Exploring Natural Language for Autonomous Driving, 2023 (Year: 2023).*

(Continued)

*Primary Examiner* — Tarek Elchanti
(74) *Attorney, Agent, or Firm* — Dickinson Wright PLLC

(57) ABSTRACT

Methods and systems for training an autonomous driving, agent-centric vison-language planning (VLP) machine learning model. Image data is obtained from a vehicle-mounted camera, encompassing details about agents situated within the external environment. Via image processing, the system identifies these agents within the environment. A Bird's Eye View (BEV) representation of the surroundings is then generated, encapsulating BEV features including spatiotemporal information linked to the vehicle and the recognized agents. Executing the VLP model begins by first extracting agent-wise BEV features from the BEV, wherein the agent-wise BEV features are associated with respective agents in the environment. Agent-wise text features are extracted from natural language text prompts. A contrastive learning model derives similarities between the agent-wise BEV features and the agent-wise text features. The BEV features are refined based on the similarities, and the refined BEV features are used in various models to generate a modified predicted trajectory of the vehicle.

17 Claims, 7 Drawing Sheets

(56) References Cited

U.S. PATENT DOCUMENTS

| | | | |
|---|---|---|---|
| 2024/0087136 | A1 | 3/2024 | Waez et al. |
| 2024/0300490 | A1 | 9/2024 | Yang et al. |

OTHER PUBLICATIONS

Olov Andersson et al., "Model-Predictive Control with Stochastic Collision Avoidance using Bayesian Policy Optimization", May 21, 2016, IEEE, 2016 ICRA, pp. 4597-4604 (Year: 2016), 8 Pages.

Xiao et al., "APPLD: Adaptive Planner Parameter Learning From Demonstration," IEEE Robotics and Automation Letters, vol. 5, No. 3, Jul. 2020, 7 pages.

Larson et al., "Derivative-free optimization methods," arXiv:1904.11585v2 [math.OC] Jun. 25, 2019, 94 pages.

Hu et al., "Planning-oriented Autonomous Driving," Computer Vision Foundation, 10 pages.

Radford et al., "Learning Transferable Visual Models From Natural Language Supervision," Proceedings of the 38th International Conference on Machine Learning, PMLR 139, 2021, 16 pages.

Learning Transferable Visual Models From Natural Language Supervision, to Radford et al. pp. 1-48 published Feb. 2021 (Year: 2021).

Jaime Fernandez, "Error Metrics for Trajectory Prediction Accuracy", Feb. 7, 2019, Wordpress (Year: 2019).

Mrinal Kalakrishnan et al., "STOMP: Stochastic Trajectory Optimization for Motion Planning", May 13, 2011, IEEE, pp. 4569-4574 (Year: 2011).

Yukang Kou and Changxi Ma, "Dual-objective intelligent vehicle lane changing trajectory planning based on polynomial optimization", Mar. 9, 2023, Elsevier, No. 128665, pp. 1-16 (Year: 2023).

Sampurna Mandal etal., "Motion Prediction for Autonomous Vehicles from Lyft Dataset using Deep Learning", Oct. 31, 2010, IEEE, 5th ICCCA, pp. 768-773 (Year: 2010).

Nathan Ratliff et al., "CHOMP: Gradient Optimization Techniques for Efficient Motion Planning", May 17, 2009, IEEE, pp. 489-494 (Year: 2009).

Rahel Vortmeyer-Kley et al., "A trajectory based loss function to learn missing terms in bifurcating dynamical systems", 2011, Scientific Reports, pp. 1-13 (Year: 2011).

* cited by examiner

VISION-LANGUAGE-PLANNING (VLP) MODELS WITH AGENT-WISE LEARNING FOR AUTONOMOUS DRIVING

TECHNICAL FIELD

The present disclosure relates to systems and methods for vision-language planning (VLP) foundation models with agent-wise learning for autonomous driving.

BACKGROUND

An autonomous vehicle, often referred to as a self-driving or driverless vehicle, is a type of vehicle capable of navigating and operating on roads and in various environments without direct human control. Autonomous vehicles use a combination of advanced technologies and sensors to perceive their surroundings, make decisions, and execute driving tasks.

Autonomous vehicles are typically equipped with a variety of sensors, including lidar, radar, cameras, ultrasonic sensors, and sometimes additional technologies like GPS and IMUs (Inertial Measurement Units). These sensors provide real-time data about the vehicle's surroundings, including the positions of other vehicles, pedestrians, road signs, and road conditions. The vehicle's onboard computers use data from sensors to create a detailed map of the environment and to perceive objects and obstacles. This information is essential for navigation and collision avoidance.

Machine learning (ML) and artificial intelligence (AI) play a crucial role in autonomous vehicles. Deep learning algorithms are used for tasks like object detection, lane keeping, and decision-making, and can rely on image processing to perform these tasks. These algorithms enable the vehicle to understand and respond to complex and dynamic traffic situations.

SUMMARY

In an embodiment, a method of training an autonomous driving system utilizing a vision-language planning (VLP) machine learning model with agent-wise learning includes the following: receiving image data generated from a camera mounted to a vehicle, wherein the image data includes agents in an environment outside the vehicle; via image processing, detecting the agents in the environment based on the image data; generating a bird eye view (BEV) of the environment based on the image data, wherein the BEV includes BEV features including spatiotemporal information associated with the vehicle and the detected agents; inputting data from the BEV into a perception model, a prediction model, and a planning model of an end-to-end autonomous driving system to generate a predicted trajectory of the vehicle; and executing an agent-centric vision-language planning (VLP) machine learning model. The VLP machine learning model is configured to, upon execution: extract agent-wise BEV features from the BEV, wherein the agent-wise BEV features are associated with respective agents in the environment, generate natural language text prompts associated with the agents in the environment, extract agent-wise text features from the natural language text prompts, wherein the agent-wise text features are associate with the respective agents in the environment, execute a contrastive learning model to derive similarities between the agent-wise BEV features and the agent-wise text features, and refine the BEV features used for the perception model, the prediction model, and the planning model based on the similarities to generate a modified predicted trajectory of the vehicle.

In another embodiment, a system utilizing a vision-language planning (VLP) machine learning model is provided. The system includes a camera mounted to a vehicle and configured to generate image data associated with agents in an environment outside the vehicle, a processor, and memory including instructions that, when executed by the processor, cause the processor to perform the functions described in the preceding paragraph.

In another embodiment, an apparatus for training at least one machine learning model includes a processor, and memory containing instructions that, when executed by the processor, cause the processor to perform these functions.

DETAILED DESCRIPTION

Figure 1:
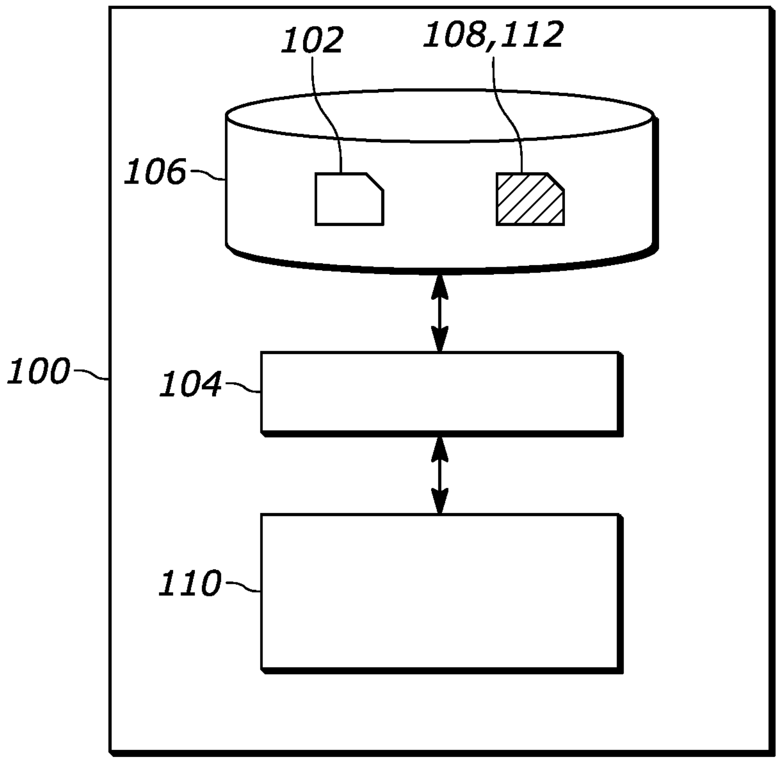
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In the context of autonomous vehicles, the term "agent" can refer to objects or entities in the environment that surrounds or interacts with the autonomous vehicle. This includes pedestrians, other vehicles, cyclists, road signs, traffic lights, lane lines, and the like. Objects or features that are being detected by the autonomous vehicle's sensors for use in decision making in controlling the autonomous vehicle can be collectively referred to as agents.

This disclosure incorporates by reference, in its entirety, U.S. patent application Ser. No. 18/388,601, filed on the same day as this disclosure, and titled "SYSTEMS AND METHODS FOR VISION-LANGUAGE PLANNING (VLP) FOUNDATION MODELS FOR AUTONOMOUS DRIVING."

Rapid advancements in autonomous driving technology have ushered in a new era of transportation, promising safer and more efficient journeys. Autonomous driving systems generally include three high-level tasks: (1) perception, (2) prediction, and (3) planning. Perception involves the vehicle's ability to understand and interpret its environment. This task includes various sub-components like computer vision, sensor fusion, and localization. Key elements of perception include object detection (e.g., identification and tracking agents external to the autonomous vehicle), localization (e.g., determining the vehicle's precise position and orientation in the world, often using GPS and other sensors), and sensor fusion (e.g., combining data from different sensors, such as cameras, lidar, radar, and ultrasonic sensors to build a comprehensive view of the surroundings). Prediction involves anticipating how other road users and agents in the environment will behave in the near future. This task often involves using machine learning models to estimate the trajectories and intentions of the agents, including pedestrians, other vehicles, and potential obstacles. Accurate prediction is crucial for making safe driving decisions. Planning involves determining the optimal path and actions for the autonomous vehicle to navigate its environment. This typically includes tasks like route planning, trajectory planning, and decision-making. The planning system considers information from perception and prediction to make decisions such as when to change lanes, when to stop at an intersection, how to react to unexpected events, and the like.

In autonomous driving system, the BEV can be the main source of information for end-to-end autonomous driving system which provides a top-down, holistic view of the surrounding environment, allowing the autonomous system to capture a comprehensive understanding of the scene. This view includes information about agents, e.g. road layouts, lanes, intersections, and the positions of objects like vehicles, pedestrians, and obstacles. A detailed BEV view allows the system to identify potential collision risks, anticipate future actions, predict object trajectories, and plan safe and efficient routes. The information and feature space in BEV map can lead to a smoother and more reliable driving experience.

However, traditional supervised learning methods have focused on aligning BEV representations with limited autonomous training data and task-specific supervision signals. When trained solely on vision inputs and a constrained autonomous dataset, models tend to converge to suboptimal states when faced with open-world scenarios. This can result in inconsistencies when compared to human common sense. In addition, while significant progress has been made in computer vision for autonomous driving, a crucial dimension has remained unexplored: the fusion of language comprehension with vision-based planning systems.

Therefore, according to various embodiments described herein, this disclosure presents a Vision-Language-Planning (VLP) Foundation model with agent-wise learning to bridge this gap. In this VLP approach, language knowledge is utilized through a contrastive learning with vision model information during training to improve the planning and generalization capability of autonomous driving systems. A goal of this is to revolutionize the landscape of autonomous driving by seamlessly incorporating language understanding into the planning process. By harnessing the power of language foundation models in tandem with advanced computer vision techniques, the accuracy, safety, and generalization capacity of autonomous driving systems can be significantly elevated.

This disclosure provides an agent-wise learning strategy to integrate Large Language Models (LLM) with an autonomous driving system, as well as improve the generalization ability of BEV feature maps. The autonomous driving system can rely on both visual data (such as sensor inputs) and contextual information (such as natural language commands or descriptions). The LLMs capture a wide range of world knowledge, including common-sense reasoning and contextual awareness. Integrating this contextual knowledge with BEV features enhances the system's ability to interpret the environment correctly. For example, it can help the system understand the meaning of terms like "slow down for the pedestrian crossing" and adjust the vehicle's behavior accordingly. In addition, aligning BEV feature space with LLM feature space allows for effective fusion of these different modalities. It enables the system to combine visual perception with the semantic understanding provided by language, creating a more holistic representation of the environment. By seamlessly integrating an LLM with autonomous driving model during training, the methods and systems described herein ensure that the autonomous driving system can handle a wide range of scenarios, making it safer, more adaptable, less reliant on specific training data, and better generalization ability on the open-set autonomous driving scenarios.

Machine learning and neural networks are an integral part of the inventions disclosed herein. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106.

The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network; this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The system 100 shown in FIG. 1 is one example of a system that may be utilized to train the machine learning models described herein.

Figure 2:
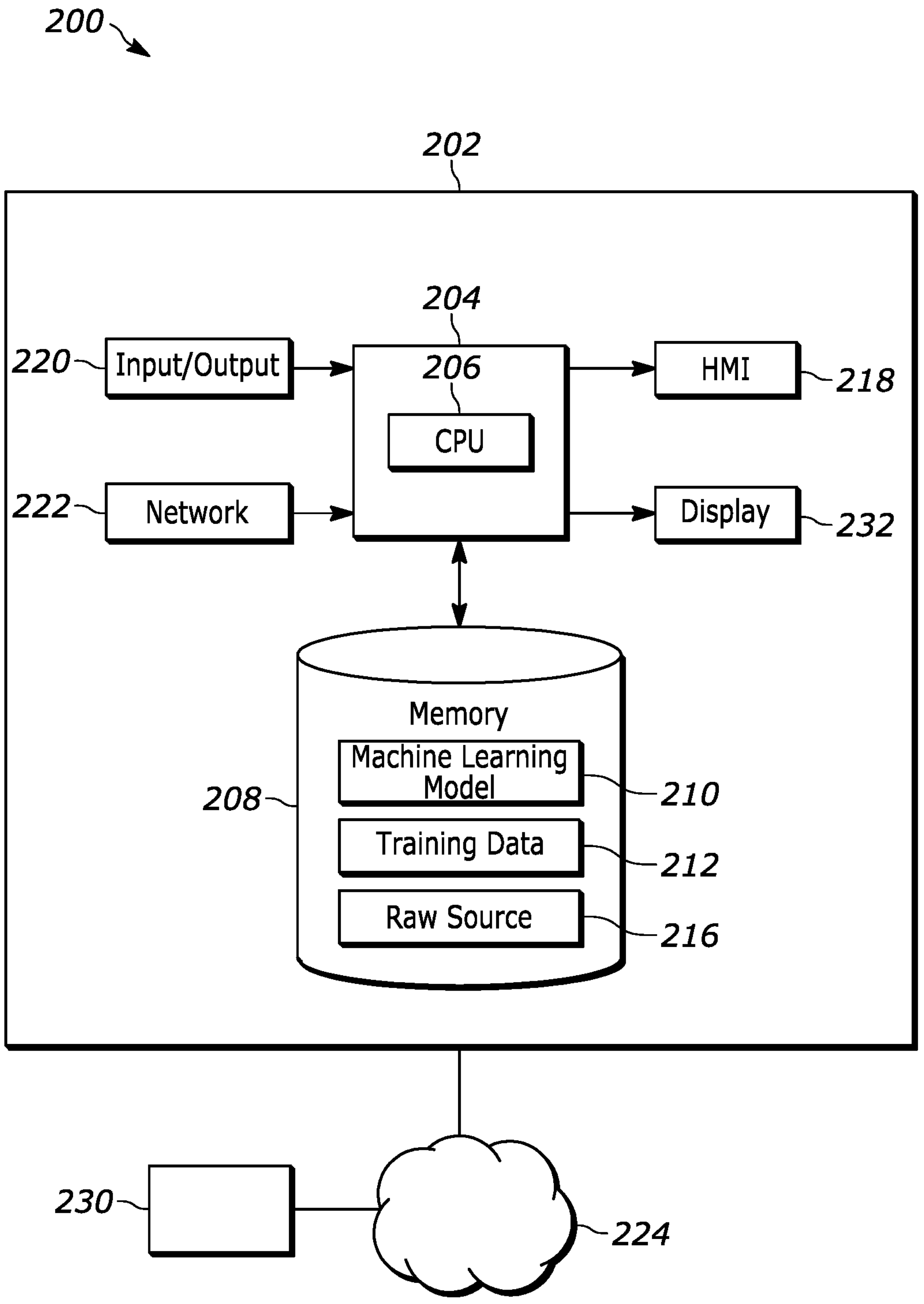
FIG. 2 shows a computer-implemented method for training and utilizing a neural network, according to an embodiment.

FIG. 2 depicts a system 200 to implement the machine-learning models described herein, for example the VLP Foundation model. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, touch screen, etc. Examples of output devices include monitors, touchscreens, speakers, head-up displays, vehicle control systems, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. The computing system 202 may include a display device 232. The computing system 202 may include hardware and software for outputting graphics and text information to the display device 232. The display device 232 may include an electronic display screen, projector, speaker or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate one or more of the machine learning models described herein, including the VLP Foundation model.

The computing system 202 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified. The training dataset 212 may also include the text description of the scene (e.g., "that corresponds to the images detected by the vehicle sensors.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data. In the context of the VLP model described herein, a loss between the predicted trajectory of the autonomous vehicle and the ground truth trajectory of the vehicle can be determined, and the VLP model can be trained to reduce this loss, e.g. to convergence.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of agents in video images, annotate the occurrences, and/or command the vehicle to take a specific action (planning) based on the locational data of the agent (perception) and the predicted future movement/location of the agent (prediction). The machine-learning algorithm 210 may be programmed to process the raw source data 216 to identify the presence of the particular features. The machine-learning algorithm 210 may be configured to identify a feature in the raw source data 216 as a predetermined feature (e.g., road sign, pedestrian, etc.). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera. And, as will be described further below with respect to the VLP Foundation model, the raw source data 216 can be natural language text information associated with the scene (e.g., "a car is entering the intersection from the left").

Figure 3:
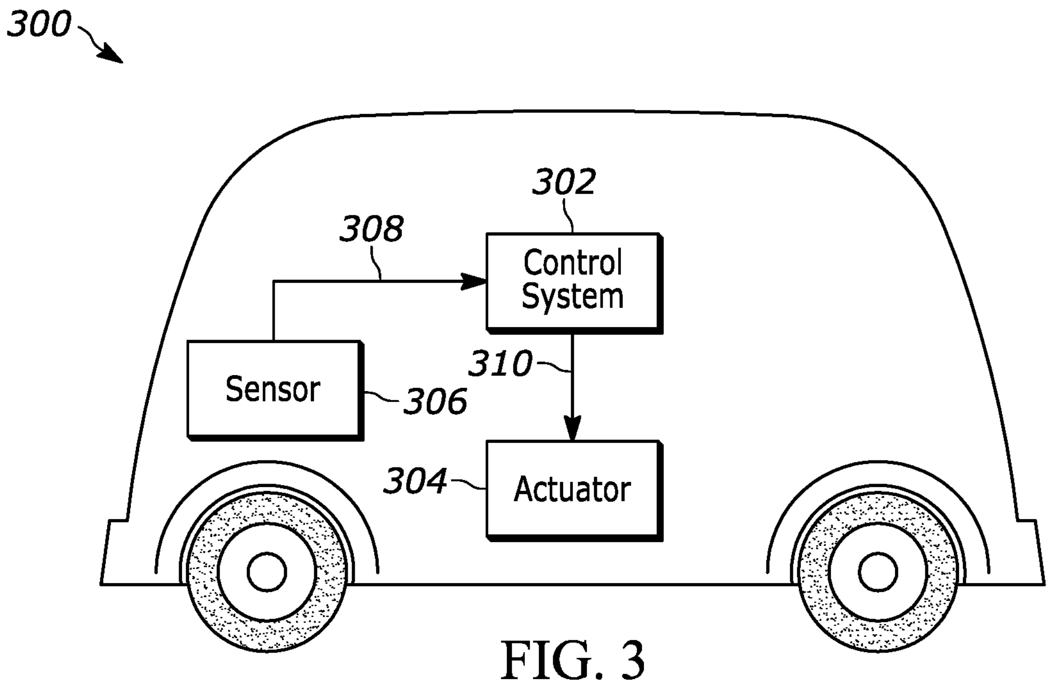
FIG. 3 shows a schematic diagram of a control system configured to control a vehicle, which may be a partially autonomous vehicle, a fully autonomous vehicle, a partially autonomous robot, or a fully autonomous robot, according to an embodiment.

FIG. 3 depicts a schematic diagram of control system 302 configured to control vehicle 300, which may be a partially autonomous vehicle or fully autonomous vehicle, partially autonomous robot or fully autonomous robot. The vehicle 300 and/or its control system 302 can incorporate one or more components of the system 200, such as computing system 202 in order to command an actuator 304 to perform a certain action based upon processing readings from one or more sensors 306. For example, control system 302 can be configured to utilize the VLP foundation model disclosed herein in order to control movement of the vehicle via actuator 304.

The one or more sensors 306 may include one or more image sensors (e.g., camera, video sensors, radar sensors, ultrasonic sensors, LiDAR sensors), and/or position sensors (e.g. GPS). The sensors 306 can be configured to generate raw source data 216. One or more of the one or more specific sensors may be integrated into vehicle 300. In the context of agent recognition and processing as described herein, the sensor 306 is a camera mounted to or integrated into the vehicle 300. Alternatively or in addition to one or more specific sensors identified above, sensor 306 may include a software module configured to, upon execution, determine a state of actuator 304.

In embodiments where vehicle 300 is a fully or partially autonomous vehicle, actuator 304 may be embodied in a brake, an accelerator, a propulsion system, an engine, a drivetrain, or a steering system (e.g., steering wheel) of vehicle 300. Actuator control commands may be determined such that actuator 304 is controlled such that vehicle 300 avoids collisions with detected agents, for example.

Detected agents may also be classified according to what classifier deems them most likely to be, such as pedestrians or trees. The actuator control commands may be determined depending on the classification.

In other embodiments where vehicle 300 is a fully or partially autonomous robot, vehicle 300 may be a mobile robot that is configured to carry out one or more functions, such as flying, swimming, diving and stepping, via actuator 304. The mobile robot may be an at least partially autonomous lawn mower or an at least partially autonomous cleaning robot. In such embodiments, the actuator control command may be determined such that a propulsion unit, steering unit and/or brake unit of the mobile robot may be controlled such that the mobile robot may avoid collisions with identified objects.

Figure 4:
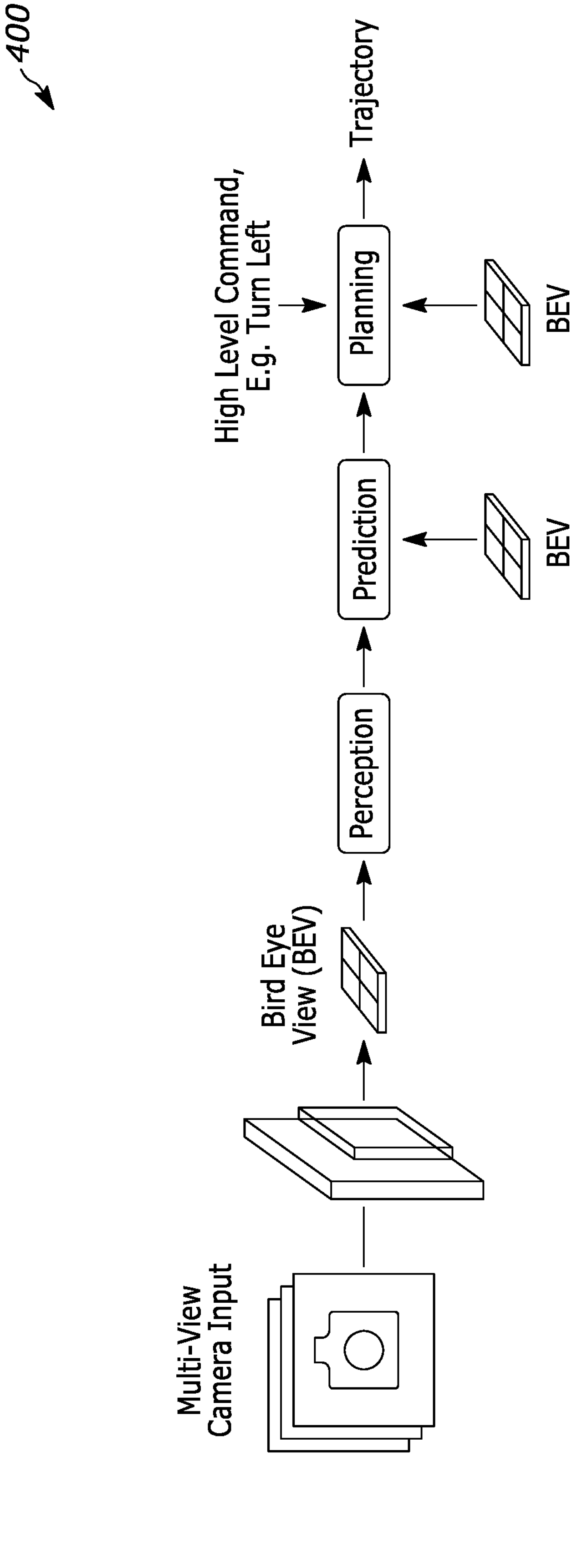
FIG. 4 shows a schematic overview of an end-to-end autonomous driving system, according to an embodiment.

FIG. 4 illustrates a high-level overview of an end-to-end autonomous driving system 400, according to an embodiment. The end-to-end system 400 may be incorporated into the vehicle 300, such as its computing system 202, in order to operate the vehicle to avoid objects or otherwise control the vehicle 300 based on the sensed environment about the vehicle 300.

Image input is received and passed through one or more ML (e.g., neural network) layers to create a BEV that represents the environment surrounding the vehicle. The BEV can be used as input to all three of the perception, prediction and planning modules. For example, the perception model utilizes computer vision based on input received from the image sensors, e.g., the BEV, in order to perform object detection and the like. The prediction model can include machine learning models configured to estimate the trajectories and intentions of the detected objects in the BEV based on those objects past movement, direction, and contextual information. The planning model can include route planning, trajectory planning, and decision-making for the vehicle to take to navigate relative to the other objects in the BEV, and turn those decisions into actions taken by the vehicle in real life.

The present disclosure introduces a Vision-Language-Planning (VLP) foundation model for autonomous driving. In embodiments, the VLP foundation model uses contrastive learning techniques, such as those introduced in a Contrastive Language-Image Pretraining (CLIP) model. Other contrastive learning models can be employed. As an example, an introduction to the CLIP model is provided, and then further description of the VLP follows.

CLIP was developed by OpenAI. It is designed to understand and connect images and natural language descriptions in a way that allows it to perform a wide range of vision and language tasks. CLIP employs a dual-encoder architecture, comprising a vision encoder and a text encoder, and a shared embedding space. The vision encoder processes images, while the text encoder processes natural language descriptions. The vision encoder, based on a vision model like a convolutional neural network (CNN), converts images into a fixed-length vector representation. The text encoder processes textual descriptions by converting them into a fixed-length vector representation. CLIP is a vision-language foundation model trained on open world data using contrastive learning. Contrastive learning is a type of machine learning where the model learns to distinguish between positive and negative pairs of data. In the context of CLIP, the "positive pair" consists of an image and a text description that are semantically related, while the "negative pair" consists of an image and a randomly selected text description that is not related. During training, CLIP is designed to encourage bringing together features from related text and images pairs into a common embedding space, while pushing unrelated pairs apart.

CLIP's shared embedding space allows for zero-shot learning. When presented with an image and a text prompt, CLIP can rank how well the image matches the prompt without specific training data for that particular task. CLIP can perform various vision-language tasks, including image classification, text-based image retrieval (e.g., retrieving images based on textual queries), image captioning, zero-shot object recognition, and others.

Figure 5:
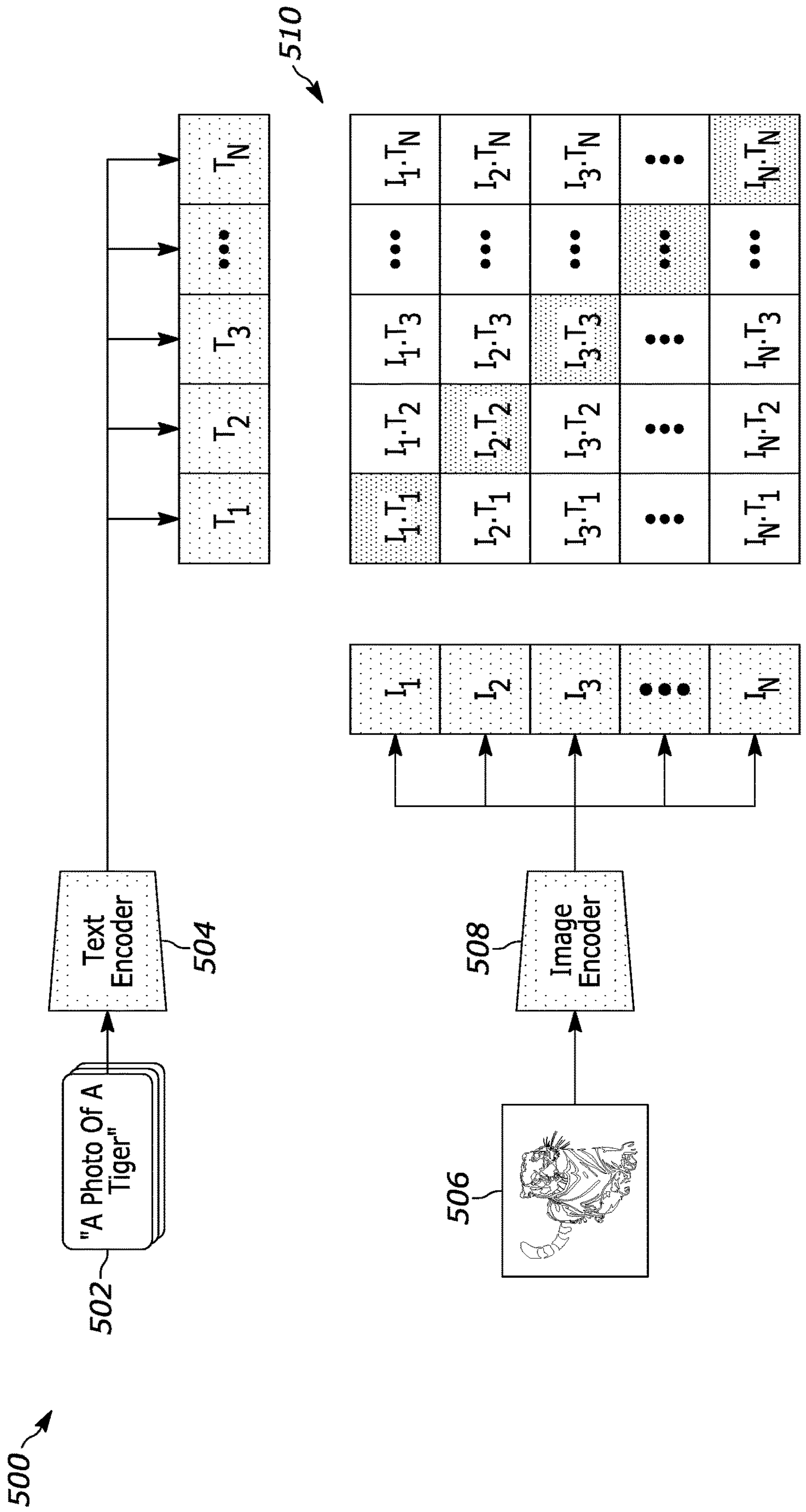
FIG. 5 shows a schematic overview of a contrastive learning model, according to an embodiment.

The contrastive learning concept used in CLIP (teachings of which are included in the VLP foundation model) is illustrated in FIG. 5, generally shown as a contrastive learning model at 500. As shown, a plurality of natural language text descriptions 502 are fed into a text encoder 504, and a plurality of images 506 are fed into an image encoder 508. The model 500 then performs feature mapping, where the vectors output by the encoders are mapped to a joint embedding space. For example, an image vector output by the image encoder (e.g., of a size 1×256) is matched to a corresponding text vector output by the text encoder (e.g., of a size 1×256). The model then performs a dot product between a batch of image and text features to get the similarity between these vectors, shown generally at 510

Referring to the example embodied in FIG. 5, a plurality of images 506 (one of which being an image of a tiger in this example) are fed into image encoder 508, and a plurality of text phrases 502 (one of which being something like "a photo of a tiger" in this example) is fed into text encoder 504. Several irrelevant or dissimilar text phrases and images are also fed into the encoders. For example, images of objects that are not tigers are fed into the image encoder 508, and phrases that have nothing to do with tigers are also fed into the text encoder 504. The image encoder produces an image vector having features $I_1, I_2, \ldots I_N$ while the text encoder produces a text vector having features $T_1, T_2, \ldots T_N$. The diagonal of the resulting matrix 510 from this dot product shows paired image and text according to their likely similarity, while the off-diagonal represent unpaired image and text features (e.g., an image of a cat and a text description like "a picture of a dog").

As such, the contrastive learning model brings the image and text embeddings closer together when they correspond to each other, and pushes them apart when they do not. In other words, referring to FIG. 5, during training, the contrastive learning model aims to increase the similarity of diagonal elements (i.e. positive pairs), while decreasing the similarity between off-diagonal elements. As another example, during training, if the model is provided with an image of a cat and a text description like "a picture of a cat"), the model aims to minimize the distance (similarity) between the image and text embeddings in the shared space; conversely, if the model is provided with an image of a cat and a text description like "a picture of a dog," the model aims to maximize the distance (dissimilarity) between their embeddings. This contrastive training objective encourages the model to learn to understand the semantic relationships between images and text. It is a way to teach the model to associate matching image-text pairs closely and distinguish non-matching pairs effectively. The result is a shared embedding space where similar pairs cluster together, and dissimilar pairs are far apart.

Referring back to FIG. 4, in previous end-to-end autonomous driving systems, only visual clues are used for the training of the BEV feature extraction. The extracted BEV features are treated as the source memory and shared among all downstream task modules, including tracking (e.g., TrackHead), mapping (e.g., MapHead), motion prediction (e.g., MotionHead), occupancy prediction (OccupancyHEad), and planning (PlanHead), for specific information prediction. The end-to-end model is trained by a unified loss which summarizes the losses from all tasks. The whole procedure can be represented as follows:

$$\text{bev\_feat} = \textit{BEVEncoder}(\text{input}_{visual}),$$
$$\text{track}_{pred} = \textit{TrackHead}(\text{bev\_feat}),$$
$$\text{map}_{pred} = \textit{MapHead}(\text{bev\_feat}),$$
$$\text{motion}_{pred} = \textit{MotionHead}(\text{bev\_feat}),$$
$$\text{occupancy}_{pred} = \textit{OccupancyHead}(\text{bev\_feat}),$$
$$\text{plan}_{pred} = \textit{PlanHead}(\text{bev\_feat}),$$
$$\text{Loss} = \text{Loss}_{track} + \text{Loss}_{map} + \text{Loss}_{motion} + \text{Loss}_{occ} + \text{Loss}_{plan},$$

where $\text{input}_{visual}$ represents visual inputs of the system, bev_feat represents the bird eye view features, $\text{task}_{pred}$ and $\text{Loss}_{task}$ indicate the predictions and loss of each task respectively, and $\text{Loss}_{task}$ refers to loss for each task e.g. tracking loss ($\text{Loss}_{track}$), mapping loss ($\text{Loss}_{map}$). $\text{task}_{pred}$ is a generalized way of referring to predictions from each task e.g. tracking predictions ($\text{track}_{pred}$) or mapping predictions ($\text{map}_{pred}$) instead of explicitly saying each one of them, However, different from this method, the present disclosure applies both visual and language clues to enrich the BEV information so as to produce better memory source for the autonomous driving system. In embodiments of an agent-wise learning approach, agent-wise sentences are formulated for each input to describe the environment, the surrounding agent status, and the situation of the autonomous vehicle itself. The agent-wise sentences can include the task ground-truth of each agent, the surrounding environment (e.g., each lane), high-level navigation commands, ground truth of the ego-vehicle (i.e., the subject autonomous vehicle), and the scene description. Such ground truth meta data is available as part of the training data for a particular image/video scene, and therefore can be generated using a template and given such ground truth information. For example, the sentence associated with one particular agent in the BEV can be: "This object is {a construction vehicle}. Its 3d bounding box is {cx, cy, cz, w, l, h, rotation, vx, vy}. It's past-future trajectory is {[[x1,y1], [x2,y2], [x3,y3], [x4,y4], [x5,y5], [x6,y6]]}. Its future trajectory will be {[x1,y1], [x2,y2], [x3,y3], [x4,y4], [x5,y5], [x6,y6]}. The scene is located in the {Singapore Onenorth}. The scene description is {Several moving pedestrians, parked cars, and motorcycle}." The information contained within the { } brackets can be generated from the ground truth data as part of a template that makes up the remainder of the sentence. Therefore, more agent-wise sentences can be generated for other agents in the environment, using a similar sentence format with different ground truth data associated with that agent.

With these agent-wise sentences, the system then executes a contrastive learning model (such as one described above, including features described in CLIP) between the agent-wise text features and the agent-wise BEV image features to push agents with similar situations closer and agents with different situations farther in the feature space. This targets on constructing a consistent feature space aligned with human common sense.

Figure 6:
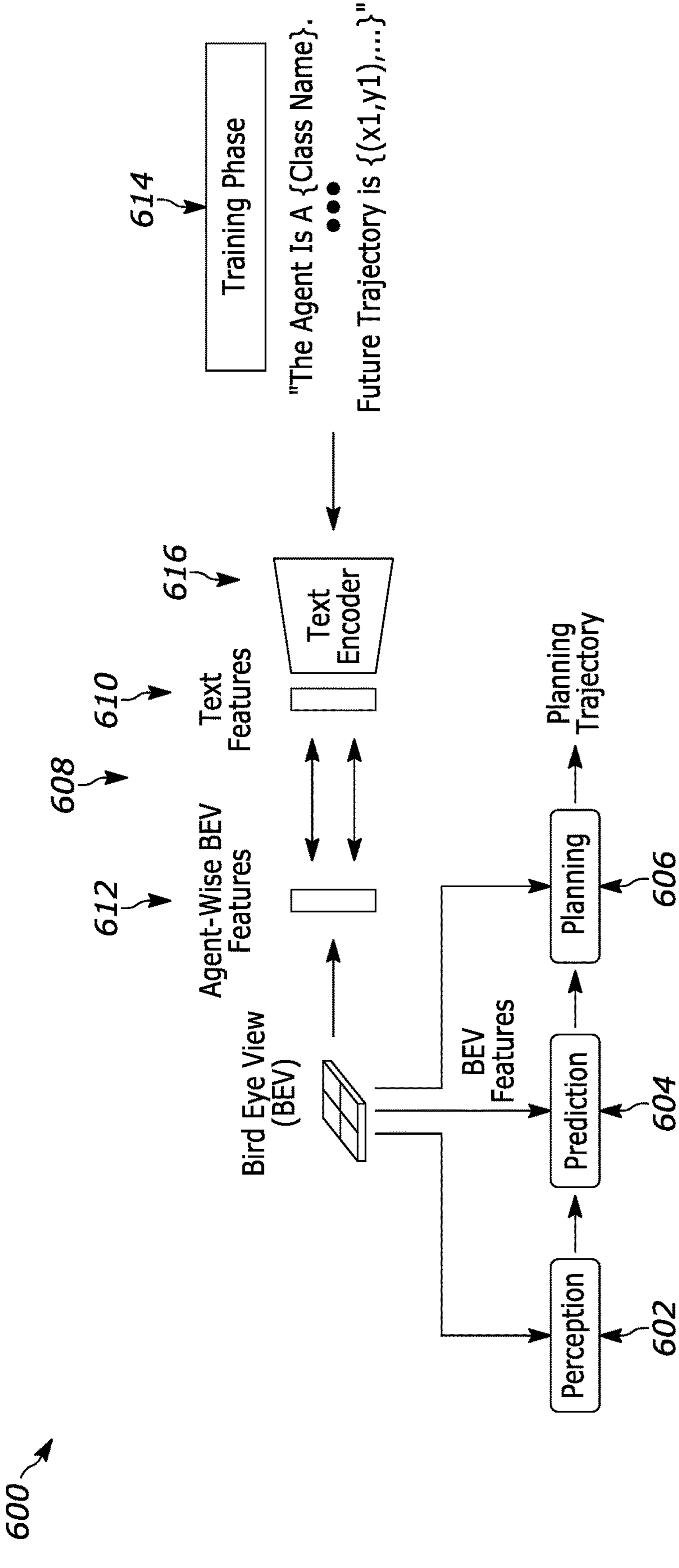
FIG. 6 shows a schematic overview of a vision-language planning (VLP) machine learning model with agent-wise learning for an end-to-end autonomous driving system, according to an embodiment.

This disclosure provides adding this textual information in the BEV encoder module of an end-to-end autonomous driving system, as illustrated in FIG. 6. FIG. 6 illustrates a schematic overview of a VLP foundation model 600 with agent-wise learning for an end-to-end autonomous driving system. The illustrated perception models 602, prediction models 604, and planning models 606 are similar to those described above (e.g., FIG. 4). Here, as illustrated by FIG. 6, these models are improved by implementing a contrastive learning model 608 that compares agent-wise text features 610 with agent-wise BEV features 612 (also referred to as agent-wise image features, as the BEV is populated via image data as described above).

The BEV can be generated from raw image data. The aw image data can be fused together to generate a bird-eye-view representation of the environment. The generated BEV is then used for downstream tasks such as perception, prediction and planning. Thus, for our approach, we leverage BEV features, e.g., features from the BEV data as opposed to the raw image data.

In an embodiment, text prompts 614 are derived from the training metadata, as described above. For example, a template can be used and filled in with text data from the training data associated with a particular scene at a particular time. As a simple example, a text string can be generated such as: "The subject agent is a {pedestrian}. Its current location is {(x1,y1)} and its future trajectory is {(x2,y2), (x3,y3), (x4,y4)}. The scene is located at the intersection of {Broad Street} and {Milk Street} in {Boston, Massachusetts}."

These text prompts 614 are forwarded to a text encoder 616. The text encoder 616 operates similar that described above with respect to contrastive learning, e.g., text encoder 504. In embodiments, the text encoder is configured to extract high-level language features as the agent-wise text features. Since the agent-wise BEV features are used for all downstream tasks, the information in the agent-wise BEV features should be aligned with the agent-wise text features. Therefore, with the agent-wise text features and the agent-wise BEV features, contrastive learning is executed at 608 between the two modes to push corresponding vision-language pairs closer while other negative pairs further, aiming to enhance the feature representation ability in a more comprehensive way. The contrastive loss ($\text{Loss}_{contra}$) is additionally included in the final loss in the training process.

The result of the contrastive learning model improves the BEV features that are input to the perception model 602, prediction model 604, and planning model 606.

With these additions, the entire process differs from that explained above, and can be represented as follows:

$$\text{bev\_feat} = \textit{BEVEncoder}(\text{input}_{visual}),$$
$$\text{pairs}_{agent} = \text{Agent}(\text{bev\_feat}, \text{input}_{gt\text{-}text}),$$
$$\text{contra}_{pred} = \textit{ContraHead}(\text{pairs}_{agent}),$$
$$\text{track}_{pred} = \textit{TrackHead}(\text{bev\_feat}),$$
$$\text{map}_{pred} = \textit{MapHead}(\text{bev\_feat}),$$
$$\text{motion}_{pred} = \textit{MotionHead}(\text{bev\_feat}),$$
$$\text{occupancy}_{pred} = \textit{OccupancyHead}(\text{bev\_feat}),$$
$$\text{plan}_{pred} = \textit{PlanHead}(\text{bev\_feat}),$$
$$\text{Loss} = \text{Loss}_{contra} + \text{Loss}_{track} + \text{Loss}_{map} + \text{Loss}_{motion} + \text{Loss}_{occ} + \text{Loss}_{plan},$$

where $input_{gt\text{-}text}$ represents text features including ground-truth of each agent, and Agent(•) indicates the module for extracting agent-wise features and formulating agent-pairs for each input.

With these teachings, the models described herein are configured to use the text features to supervise the BEV image features during training to produce better source memory for the system and improve generalization ability of the model.

Figure 7:
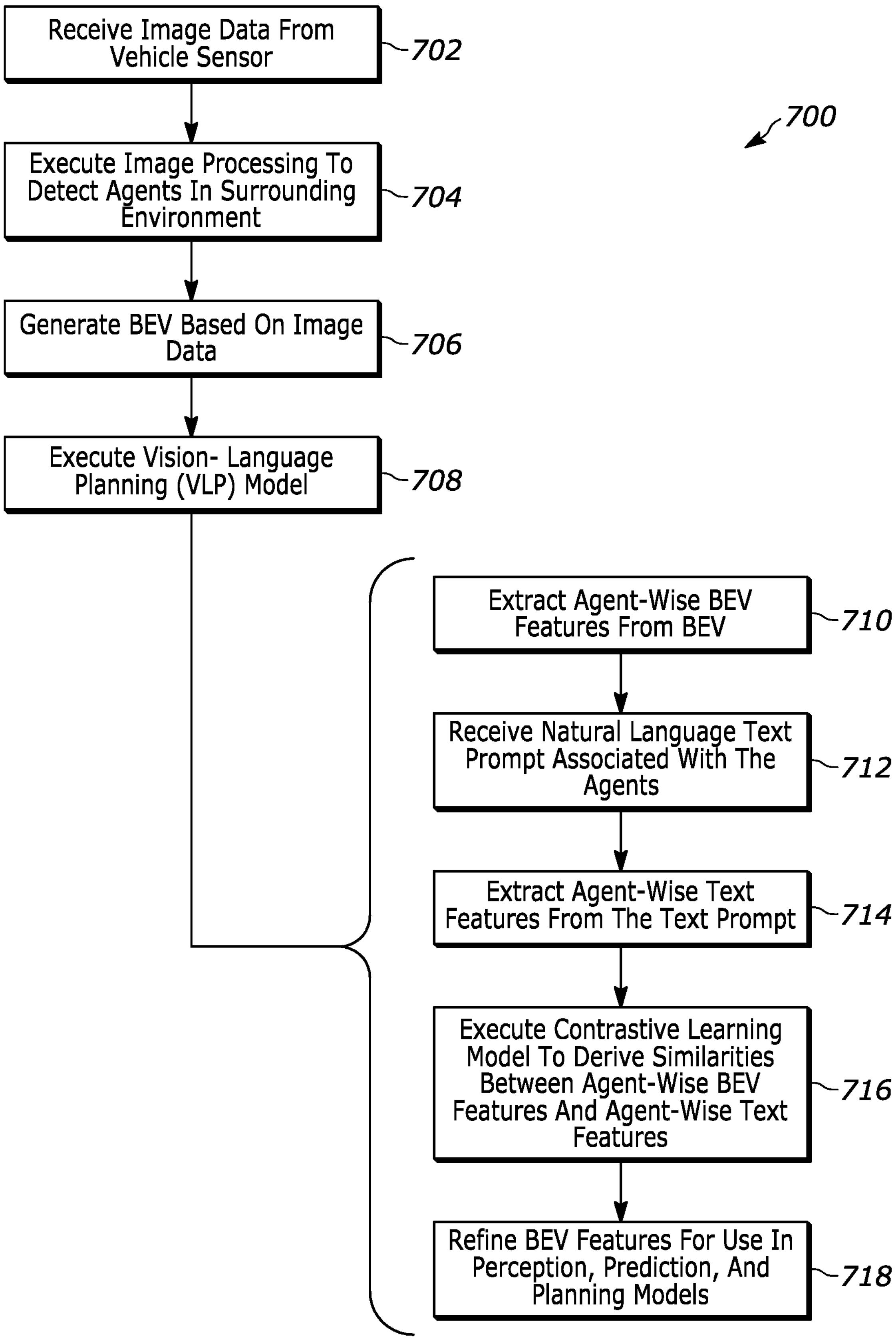
FIG. 7 shows a schematic of a method of training an autonomous driving system utilizing a VLP machine learning model, according to an embodiment.

FIG. 7 illustrates a method 700 of training an autonomous driving system utilizing a vision-language planning (VLP) machine learning model, according to an embodiment. The method can be carried out by one or more of the processors disclosed herein. At 702, image data is generated from a camera mounted to a vehicle. For example, this camera can be one of the sensors 306 described above. The generated image data includes agents in an environment or scene outside of the vehicle.

At 704, image processing is executed on the image data in order to detect agents in the environment. Object recognition and classification can be used, as explained above. At 706, a BEV is generated based on the image data, and the results of the object recognition or other object detection. The BEV includes BEV features, such as spatiotemporal information associated with the vehicle and the detected agents.

At 708, an agent-centric vision-language planning (VLP) machine learning model is executed. During execution of the VLP model, at 710 agent-wise BEV features are extracted from the BEV. The agent-wise BEV features are focused on and associated with agents in the environment. In other words, the agent-wise BEV features extracted correspond to a particular known agent, or multiple known agents. At 712, natural language text prompts are generated. These prompts are associated with the agents in the environment. For example, one type of natural language prompt can be "this is a pedestrian that is crossing the road and will be at location (x1,y1) in 3.5 seconds at its current speed." At 714, agent-wise text features are extracted from the natural language text prompts. These agent-wise text features are associated with the respective agents in the environment. At 716, a contrastive learning model is executed in order to derive similarities between the agent-wise text features and the agent-wise BEV features. At 718, the BEV features are refined, based on the similarities, for use in the perception model, the prediction model, and the planning model in order to generate a new, modified predicted trajectory of the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of training an autonomous driving system utilizing a vision-language planning (VLP) machine learning model with agent-wise learning, the method comprising:

receiving image data generated from a camera mounted to a vehicle, wherein the image data includes agents in an environment outside the vehicle;

via image processing, detecting the agents in the environment based on the image data;

generating a bird eye view (BEV) of the environment based on the image data, wherein the BEV includes BEV features including spatiotemporal information associated with the vehicle and the detected agents;

inputting data from the BEV into a perception model, a prediction model, and a planning model of an end-to-end autonomous driving system to generate a predicted trajectory of the vehicle; and executing an agent-centric vision-language planning (VLP) machine learning model to:

extract agent-wise BEV features from the BEV, wherein the agent-wise BEV features are associated with respective agents in the environment, generate natural language text prompts associated with the agents in the environment, extract agent-wise text features from the natural language text prompts, wherein the agent-wise text features are associate with the respective agents in the environment, execute a contrastive learning model to derive similarities between the agent-wise BEV features and the agent-wise text features, wherein the contrastive learning model includes (i) a text encoder configured to output a text-based vector representing the agent-wise text features associated with the natural language text prompts, and (ii) an image encoder configured to output an image-based vector representing agent-wise BEV features associated with the agents in the BEV, and wherein execution of the contrastive learning model evaluates similarities between the text-based vector and the image-based vector, and refine the BEV features used for the perception model, the prediction model, and the planning model based on the similarities to generate a modified predicted trajectory of the vehicle.

2. The method of claim 1, further comprising:

determining a loss between the predicted trajectory of the vehicle and a ground truth trajectory of the vehicle; and repeat the steps of claim 1 until convergence to minimize the loss.

3. The method of claim 1, wherein the natural language text prompts are generated using a template and ground truth information associated with the environment existent in training data.

4. The method of claim 1, wherein an output of the contrastive learning is used as a training loss for training the VLP machine learning model.

5. The method of claim 1, wherein the contrastive learning model is further configured to execute a dot product to evaluate the similarities between the text-based vector and the image-based vector.

6. The method of claim 1, wherein the contrastive learning model is further configured to push apart dissimilarities between the agent-wise BEV features and the agent-wise text features.

7. The method of claim 1, further comprising:

repeating of the executing of the agent-centric VLP machine learning model until convergence; and outputting a trained agent-centric VLP machine learning model based on the convergence.

8. A system utilizing a vision-language planning (VLP) machine learning model, the system comprising:

a camera mounted to a vehicle and configured to generate image data associated with agents in an environment outside the vehicle;

a processor; and memory including instructions that, when executed by the processor, cause the processor to:

process the image data to detect agents in the environment, generate a bird eye view (BEV) of the environment based on the image data, wherein the BEV includes BEV features including spatiotemporal information associated with the vehicle and the detected agents, input data from the BEV into a perception model, a prediction model, and a planning model of an end-to-end autonomous driving system to generate a predicted trajectory of the vehicle, and execute an agent-centric vision-language planning (VLP) machine learning model to:

(i) extract agent-wise BEV features from the BEV, wherein the agent-wise BEV features are associated with respective agents in the environment, (ii) generate natural language text prompts associated with the agents in the environment, (iii) extract agent-wise text features from the natural language text prompts, wherein the agent-wise text features are associate with the respective agents in the environment, (iv) execute a contrastive learning model to derive similarities between the agent-wise BEV features and the agent-wise text features, wherein the contrastive learning model includes (a) a text encoder configured to output a text-based vector representing the agent-wise text features associated with the natural language text prompts, and (b) an image encoder configured to output an image-based vector representing agent-wise BEV features associated with the agents in the BEV, wherein execution of the contrastive learning model evaluates similarities between the text-based vector and the image-based vector, and (v) refine the BEV features used for the perception model, the prediction model, and the planning model based on the similarities to generate a modified predicted trajectory of the vehicle.

9. The system of claim 8, wherein the memory includes further instructions that, when executed by the processor, cause the processor to:

determine a loss between the predicted trajectory of the vehicle and a ground truth trajectory of the vehicle; and execute the VLP model until convergence to minimize loss.

10. The system of claim 8, wherein the natural language text prompts are generated using a template and ground truth information associated with the environment existent in training data.

11. The system of claim 8, wherein an output of the contrastive learning is used as a training loss for training the VLP machine learning model.

12. The system of claim 8, wherein the contrastive learning model is further configured to execute a dot product to evaluate the similarities between the text-based vector and the image-based vector.

13. The system of claim 8, wherein the contrastive learning model is further configured to push apart dissimilarities between the agent-wise BEV features and the agent-wise text feature.

14. The system of claim 8, wherein the memory includes further instructions that, when executed by the processor, cause the processor to:

repeat the executing of the agent-centric VLP machine learning model until convergence; and output a trained agent-centric VLP machine learning model based on the convergence.

15. The system of claim 8, wherein the agents in the environment include at least one of a pedestrian, another vehicle, or a cyclist.

16. An apparatus for training at least one machine learning model, the apparatus comprising:

a processor; and memory including instructions that, when executed by the processor, cause the processor to:

process image data generated from a camera mounted to a vehicle in order to detect agents in the environment, generate a bird eye view (BEV) of the environment based on the image data, wherein the BEV includes BEV features including spatiotemporal information associated with the vehicle and the detected agents, input data from the BEV into a perception model, a prediction model, and a planning model of an end-to-end autonomous driving system to generate a predicted trajectory of the vehicle, and execute an agent-centric vision-language planning (VLP) machine learning model to:

(i) extract agent-wise BEV features from the BEV, wherein the agent-wise BEV features are associated with respective agents in the environment, (ii) generate natural language text prompts associated with the agents in the environment, (iii) extract agent-wise text features from the natural language text prompts, wherein the agent-wise text features are associate with the respective agents in the environment, (iv) execute a contrastive learning model to derive similarities between the agent-wise BEV features and the agent-wise text features, wherein the contrastive learning model includes (a) a text encoder configured to output a text-based vector representing the agent-wise text features associated with the natural language text prompts, and (b) an image encoder configured to output an image-based vector representing agent-wise BEV features associated with the agents in the BEV, wherein execution of the contrastive learning model evaluates similarities between the text-based vector and the image-based vector, and (v) refine the BEV features used for the perception model, the prediction model, and the planning model based on the similarities to generate a modified predicted trajectory of the vehicle.

17. The apparatus of claim 16, wherein the memory includes further instructions that, when executed by the processor, cause the processor to:

determine a loss between the predicted trajectory of the vehicle and a ground truth trajectory of the vehicle; and execute the VLP model until convergence to minimize loss.

* * * * *